UNITED STATES PATENT OFFICE.

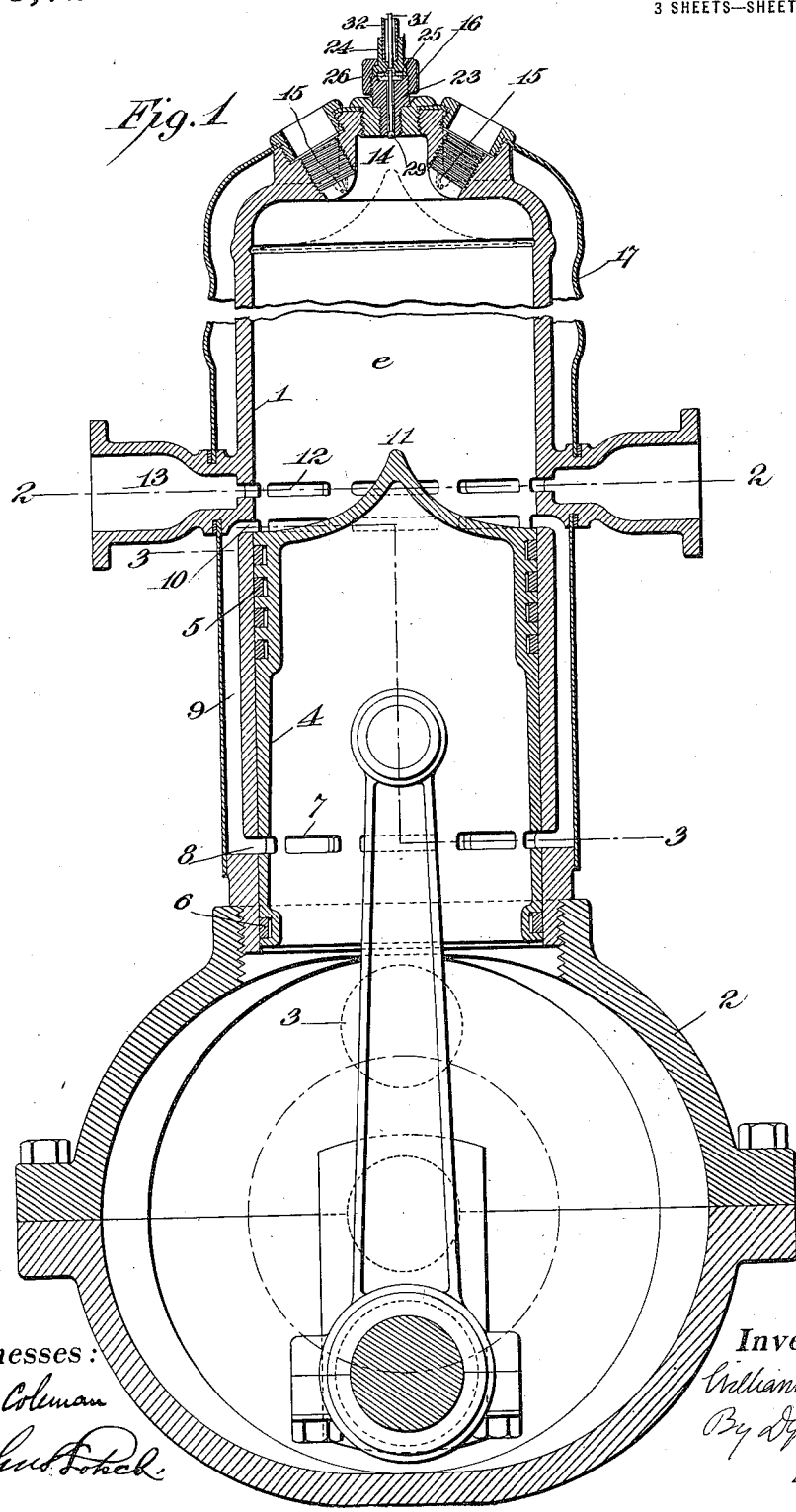

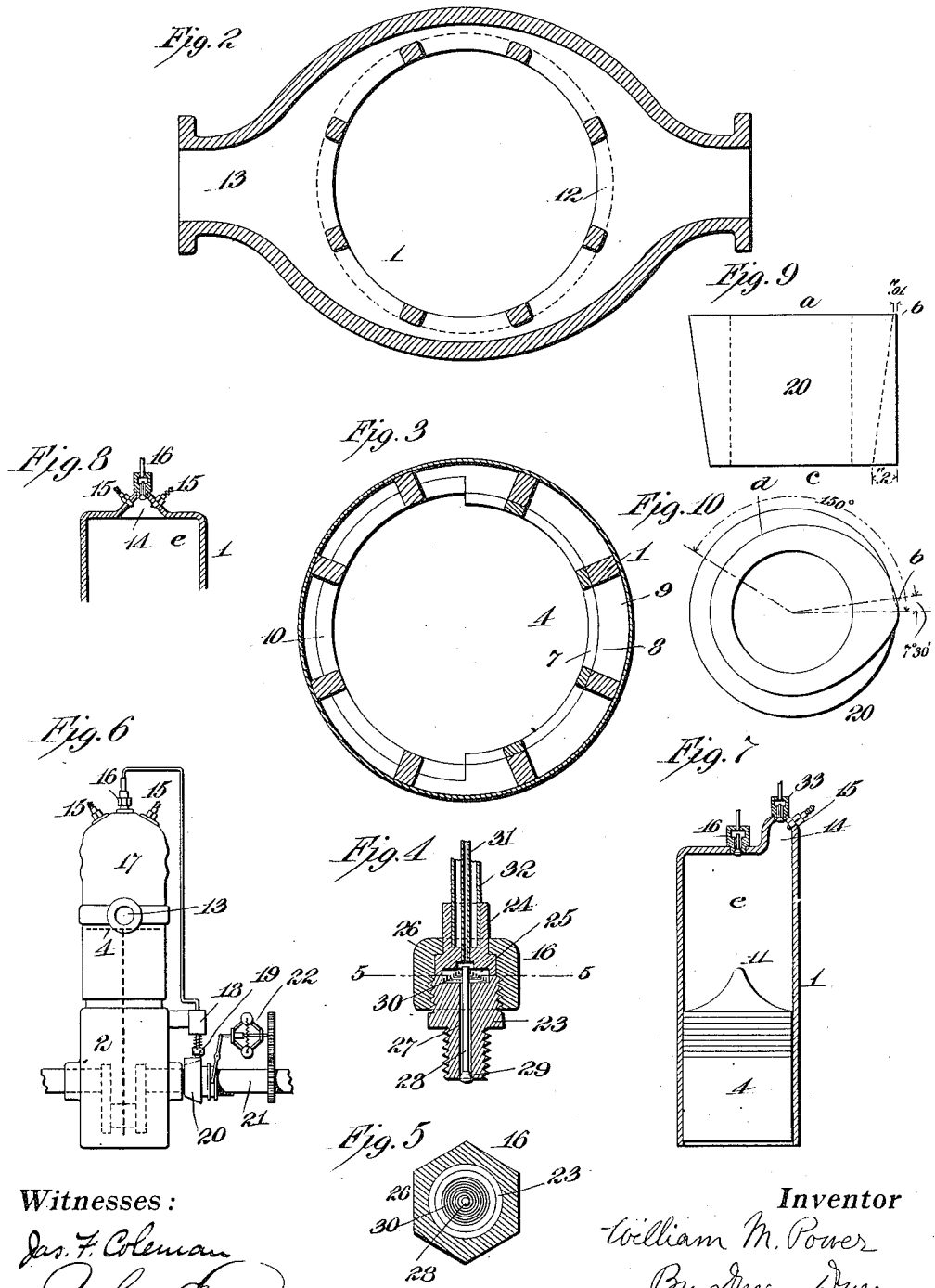

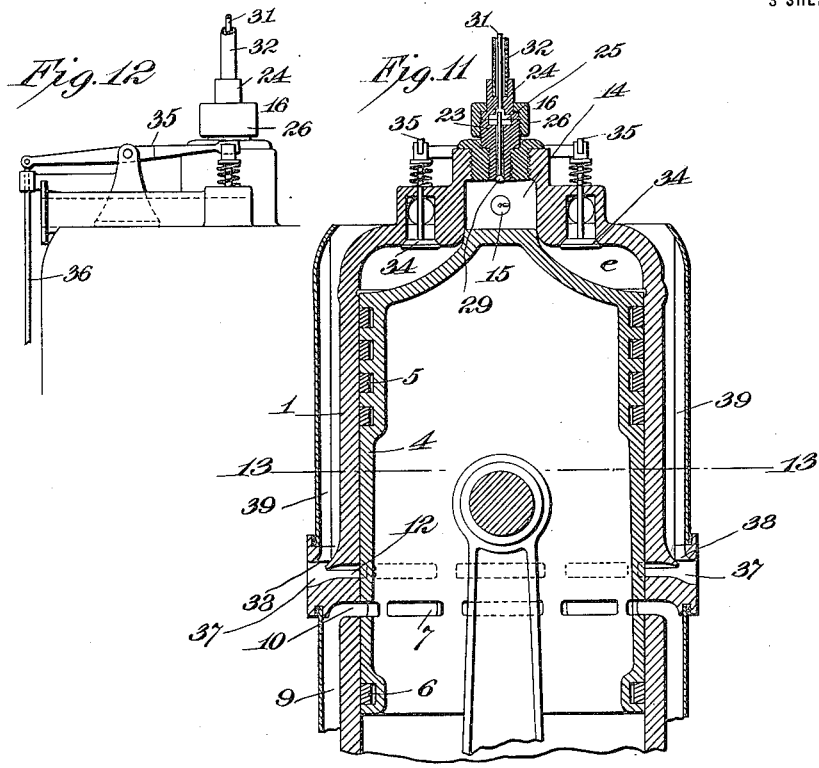
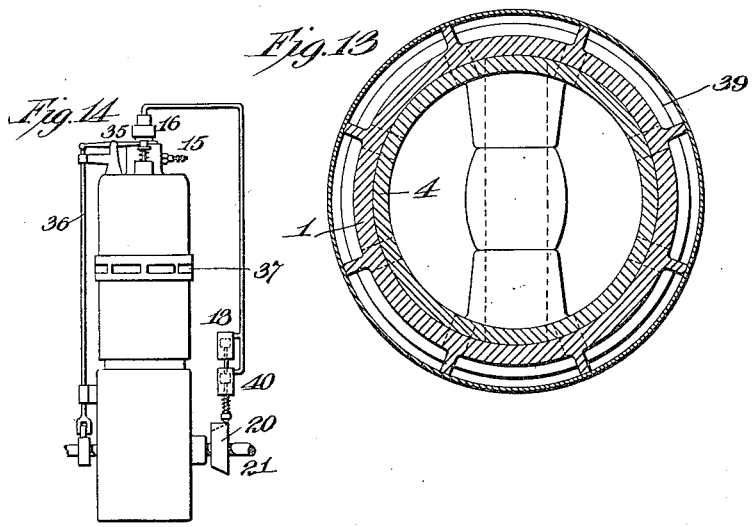

WILLIAM M. POWER, OF PORT CHESTER, NEW YORK.

INTERNAL-COMBUSTION ENGINE.

1,235,725.  Specification of Letters Patent.  Patented Aug. 7, 1917.

Application filed October 22, 1906, Serial No. 339,900. Renewed January 17, 1913. Serial No. 742,744.

*To all whom it may concern:*

Be it known that I, WILLIAM M. POWER, a citizen of the United States of America, residing in Port Chester, county of Westchester, State of New York, have invented an Improvement in Internal-Combustion Engines, of which the following is a specification.

The object I have in view is the production of an internal combustion engine, preferably, although not necessarily, of the two stroke cycle type. The invention relates to certain principles and details of construction by means of which the bulk, weight and cost of the engine will be reduced and its efficiency increased.

I attain these objects by the mechanism illustrated in the accompanying drawings, in which—

Figure 1 represents a vertical section of an engine embodying my invention,

Fig. 2, a section on the line 2—2 thereof, and

Fig. 3 a section on the line 3—3 thereof,

Fig. 4 is an enlarged sectional view of the atomizer,

Fig. 5 is a section thereof on the line 5—5,

Fig. 6 is a reduced view, partly diagrammatic, of the complete engine,

Fig. 7 is a sectional view of the cylinder of a modified form of engine,

Fig. 8 is a sectional fragmentary view of a modified form of cylinder.

Fig. 9 is a view, partly diagrammatic, of the controlling cam,

Fig. 10 is an end view thereof.

Fig. 11 is a sectional view of the upper part of an engine showing a modification, Fig. 12 is a side view of a portion thereof, Fig. 13 is a sectional view on line 13—13 of Fig. 11, and Fig. 14 is a reduced view, partly diagrammatic, of the engine shown in Figs. 11 to 13.

In all of the views, like parts are indicated by the same reference characters.

The engine illustrated is a one-cylinder two stroke cycle engine, but the number of cylinders which may be used is immaterial, and certain features of the invention may be employed with an engine which does not operate on the two stroke cycle type principle.

In Fig. 1, the cylinder 1 is screwed into the crank case 2. The position of the inlet valve is shown at 3. Any well known form of valve may be employed for admitting air into the crank case and permitting it to be compressed by the engine piston. The piston 4 is hollow and is provided with the usual packing rings 5 near the top and a ring 6 near the bottom. Between the rings 5 and 6 is a port 7. This port extends entirely around the piston, and is substantially continuous, but is necessarily interrupted at intervals in order to provide webs for imparting the necessary strength to the piston. The piston port 7, when the piston is at its lowest point of movement, communicates with a cylinder port 8 which is also annular. This port 8 communicates with a chamber 9, which is shown as made of the cylinder walls on one side and a sheet metal tube upon the other, but it is obvious that the chamber may be made in other ways. The upper end of the chamber communicates with an admission port 10 so located within the cylinder that it will be exposed or opened when the piston descends to the lowest part of its stroke. This admission port 10 extends completely around the cylinder and is continuous except for the space occupied by the webs necessary for holding the cylinder together. When these webs are omitted the port is entirely continuous around the cylinder. The top of the piston is conical in shape, as shown, and rises to a point 11 at the center of the top of the piston. The configuration of the top from outside to the point 11 is preferably concavely curved, as shown. The exhaust port 12 is arranged above the inlet port 10 a sufficient distance to permit a certain amount of the products of combustion to be exhausted before the scavenging charge of air enters the cylinder. This port 12, like the inlet port 10, is continuous, except for the interval occupied by the webs which hold the cylinder together, as has already been observed. The ports 10 and 12 are shown as interrupted at intervals by webs, which is necessary owing to the manner of casting the cylinder. It is apparent that the cylinder may be so formed that webs do not appear in either the ports 10 or 12. The width of the ports 8, 10 and 12 should be less than the width of a packing ring 5 or 6 so that there will be no opportunity for a ring springing outward into a port. The exhaust port 12 communicates with an exteriorly arranged conduit 13 for carrying off the products of combustion. At the head of the cylinder, as shown in Fig. 1, is an ignition pocket 14. In this pocket are the ignition plugs 15, 15—two are shown, but the number may be increased or diminished as desired.

The location of the two or more ignition plugs within the ignition pocket permits the use of one or more such igniters, the igniters being in the same relative position to the fuel atomizer whether one or more is used. At the top of the ignition pocket 14 is shown the atomizer 16. This atomizer serves as a means for atomizing or breaking up the liquid hydrocarbon which forms the fuel. A water jacket is shown as formed of a cover 17 of sheet metal inclosing the upper part of the cylinder. It is obvious that the water-jacket may be made in any other way. That portion of the cylinder above the piston constitutes the combustion chamber $e$.

The charge of hydrocarbon is adapted to be injected into the combustion chamber during the compression stroke of the piston. For that reason a pump 18, communicating with the atomizer 16, is provided. This pump may be actuated by any means, but I prefer to employ a cam having a variable throw so arranged that the stroke of the pump may be varied and the amount of fuel delivered to the engine will be varied accordingly. Any form of pump may be used, that shown in Fig. 6 being solely for the purpose of illustration.

The plunger of the pump is provided with a ball 19 which travels upon the working face of the cam 20. This cam is shown as mounted upon the crank shaft 21 of the engine and is so fitted by means of a feather or other means that it may be longitudinally moved thereon. This movement may be effected by means of a governor 22 or by a hand lever or pedal. The shape of the cam is shown in Figs. 9 and 10; this cam operating the pump with a variable stroke, which stroke terminates in a constant position, the beginning of the stroke being varied. As an example, the maximum period during which fuel is injected into the cylinder may be during 150° of the travel of the crank and the minimum 1/20 of this, or 7 degrees 30 minutes. This example, of course, is simply for illustration and is not to be considered as limiting the degree or period during which fuel is injected. One end of the cam, at $a$, is of circular cross-section, except for a portion of 7 degrees 30 minutes, at $b$. This portion $b$ constitutes the cam for raising the pump piston and injecting the fuel. The height of this cam, as shown in Fig. 9, is 1/100 of an inch, which represents the minimum extent of movement of the piston of the pump. At the extreme extent of movement upon the other end $b$ of the cam $a$, the cam face is shown as extending 150°. The drop is shown as 2/10 of an inch or 20 times the extent of the drop on the other end of the cam. The cam-faces along $a$ and $b$ are preferably drawn upon a true spiral. In that case, the cam-face $b$ would properly be a portion of the cam-face $d$, but for clearness of illustration it is shown as of somewhat sharper pitch than the cam-face $d$. The backs of the cam-faces or protuberances taper to the concentric portion of the cam-block so that in the event of the engine running backward there would be nothing to catch the ball 19.

The atomizer 16 comprises a plug 23 which is screwed into a tapered opening in the ignition pocket 14. This plug has connected to it a second plug 24; the opposing faces of the two plugs being hollowed out so as to produce a chamber 25. The two plugs are secured together by means of a coupling 26. The plug 23 is provided with a central longitudinal opening 27 within which is a headed rod 28, the head 29 of which has tapering walls. A spring 30 lies within the chamber 25, and serves to elevate the head 29 of the rod 28 and close the valve. The spring is shown as in the form of a flat helical spring. The spring 30 and chamber 25 are made as small as possible in order to reduce dead space. A capillary tube 31 connects the pump 18 and chamber 25. A covering tube 32 protects the capillary tube 31 from injury.

The operation of so much of my invention as has been described, is as follows:—

The charge of air is drawn into the crank-case 2 through the valve 3 by means of the piston during the ascent of the latter. During the descent of the piston, air is compressed within the crank-case and as soon as the ports 7 and 8 coincide, this compressed air passes, in the form of an annular sheet, through the jacket 9 and enters the combustion chamber of the cylinder through the inlet port 10. During the descent of the piston the exhaust port 12 will be first exposed, permitting the discharge of a proportion of the products of combustion. As soon as the port 10 is open, the air under pressure will enter the combustion chamber in an annular sheet, directed toward the center of the chamber. The air will be deflected upward by means of the cone-shape of the upper face of the piston, and will be compacted in a solid column which will be driven up to the top of the head of the cylinder. At this point it will umbrella and pass downward between the ascending column and the walls of the cylinder. This ascending, traversing and descending of the column of air will thoroughly scavenge the combustion chamber and, during the elevation of the piston, the air within it will be compressed. The pump 18 will inject the liquid hydrocarbon through the vaporizer 16 into the ignition pocket 14 and combustion chamber above the piston. The period of injection will be varied according to the work demanded. The point of beginning of injection will be varied, but the point of ending will be constant. Where the charge of fuel is injected during the entire compression stroke, or under heavy loads, when the injection takes place through a large number of degrees of crank angle, the point of ending of the injection may be advanced slightly, as otherwise the mixture adjacent to the igniter would be too rich to inflame. The point of ending should coincide substantially with the point of greatest elevation of the piston. The fuel being forced by the pump through the capillary tube 31 and into the chamber 25, striking the inclined walls of the head 29, will pass out through the atomizer in the form of an annular diverging spray. By making the chamber 25 of but small size, there will be no possibility of an air space forming; consequently the hydrocarbon will be ejected from the atomizer by the slightest movement of the pump 18.

The spray of hydrocarbon issuing from the atomizer 16 will pass through the ignition pocket 14 into the combustion chamber and at the proper point during compression, the charge will be ignited. The use of the ignition pocket 14 is important, as it insures the absolute and certain firing of the charge. The hydrocarbon passing through the ignition pocket 14 into the combustion chamber will at all times preserve an ignitible mixture within that chamber and adjacent to the sparking point. Even, therefore, if the charge within the rest of the cylinder is so poor, that it would not ignite, the charge within the ignition pocket 14 will always be ignitible and will communicate the ignition to the rest of the charge.

The location of the ignition pocket 14 is not essential. In Fig. 7, I have shown it as arranged to one side of the center of the cylinder. A separate atomizer 33 communicating with the ignition pocket 14 is provided. This atomizer is useful where the main hydrocarbon is not an easily volatilized oil. In such case, the atomizer 33 could be used for introducing a charge of gasolene or similar easily volatilized oil into the ignition pocket 14, thus insuring the starting of the engine and its continued operation by insuring the inflammation of the heavier fuel by means of the priming charge.

In Fig. 8, the ignition pocket 14 is provided with conical walls which make it possible to arrange the igniting plugs in somewhat better position.

The substantially continuous admission and exhaust ports, having the admission port below the exhaust port, permit the making of an absolutely symmetrical cylinder with an ideally shaped combustion chamber. This is because the small area of the water cooled walls of the combustion chamber in relation to the entire contents of the combustion chamber results in small heat loss to the water jacket at the moment of highest temperatures. The form of ports also permits the piston to have the greatest length of effective stroke; the ports extending all the way around the cylinder need not be as deep as they would be, if they did not so extend around the cylinder. The disposition of the ports with the conical piston top, allows for very perfect scavenging.

The advantages incident to my improved means for introducing the fuel allow for, first, scavenging the cylinder with pure air, this scavenging being constant no matter what the load is upon the latter and without the possibility of loss of fresh combustible through the exhaust port on account of intermingling of the fresh combustible and products of combustion; and, second, by having the fuel pump cam so high that the final feeding takes place at a constant point in the cycle of the engine. The combustible mixture is fed sufficiently close to the ignition plug to insure prompt inflammation, providing that the minimum feed from the pump is sufficient to properly carburet the air immediately adjacent to the ignition device. The ignition of this small quantity of gas acts as a priming charge to insure the combustion of any part of the hydrocarbon no matter how diffused in the cylinder.

Under ordinary conditions, the amount of diffusion determines the rate of inflammation of the entire charge except that where the diffusion is constant throughout the combustion chamber, a point is very quickly reached where, with the ordinary means of ignition, the inflammation will not travel on account of the mixture being too poor under these conditions. With my arrangement of atomizing nozzle, the velocity of the fuel through the nozzle remains constant independently of quantity. Since the small conical valve in the nozzle is spring-seated, the pressure required to raise this valve off its seat will remain constant with a uniform velocity of the issuing jet. Furthermore, the form of spraying nozzle insures an absolutely equal distribution of fuel issuing from the nozzle owing to the fact that the conical valve is centered automatically by the issuing liquid.

The inflammation of the small charge of fuel in the ignition pocket immediately imparts its heat to the balance of the compressed charge in the combustion chamber proper. Whether this mixture be composed of fresh air or exhaust gas, the result is to heat the entire contents more or less, increasing its pressure a corresponding amount. Under low loads, where a small quantity of fuel is used, the result is a small increase in temperature. The loss of heat, however, to the cylinder walls decreasing as the difference in temperature is decreased, is very markedly reduced and the thermo-dynamic efficiency of the motor increased.

Figs. 11 to 14 show several modifications. In Fig. 11 the top of the piston is in the shape of the frustum of a cone, with the apex of such a size and shape as to practically close the ignition pocket when the piston is at the top of its stroke. In this case, the pocket will be practically closed and the character of the explosive mixture within it accurately determined. In this modification is also illustrated supplementary exhaust valves 34 which permit the escape of a portion of the scavenging charge. These valves are properly operated by mechanism including the levers 35 and link 36 during the compression stroke. Under these conditions, the unswept area must be correspondingly decreased in size, giving a constant compression and a correspondingly increased expansion.

In the same figure is shown a construction whereby the water jacket is eliminated. The outlet port 12 ends in a nozzle 37, which communicates with an annular nozzle 38 communicating with the casing or jacketed space 39, which is open at both top and bottom. The exhausted contents of the combustion chamber will draw a current of air downward through the jacketed space 39, thus effectually cooling the cylinder. This idea may be used alone or in connection with a water jacket.

In Fig. 14 is shown an additional pump 40 coupled to the operating mechanism of the pump 18, to inject a quantity of air into the cylinder with the fuel. The structure shown will inject a variable quantity of air depending upon the quantity of fuel injected. By separately actuating the air pump 40, the quantity of air injected could be invariable or it could vary independently of that injected by the pump 18.

The ports 8, 10 and 12 may be actually continuous, the webs not extending to the walls of the cylinder. This can be made by placing the webs outside of the cylinder walls.

The valve 29 permits the retention, at any desired pressure, of the fuel with the entablature between this valve and the delivery valve of the pump, depending upon the pressure required to unseat the valve 29 against the action of its spring. This is important, as without the valve 29, the fuel might have a tendency to vaporize owing to the presence of heat within the entablature caused by the heat of the water jacket or by other causes. The design of the valve 29 by means of which it is centered by the outgoing stream of fuel permits the valve to be moved to one side to permit obstructions to be passed out.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described and ascertained the nature of my said invention, and in what manner the same is to be performed, I declare that what I claim and desire to secure by Letters Patent is:

1. An internal combustion engine having an ignition pocket, means for introducing liquid fuel into such ignition pocket during the compression stroke, and additional means for introducing liquid fuel into the combustion chamber during the compression stroke.

2. An internal combustion engine, having a combustion chamber, an ignition pocket communicating therewith, and an igniter in communication with the ignition pocket, means for introducing fuel into the ignition pocket during the compression stroke, and additional means for introducing fuel into the combustion chamber during the compression stroke.

3. An internal combustion engine, having a combustion chamber, means for introducing fuel directly therein during the compression stroke, and an ignition pocket, an igniter therein, and additional means for introducing a priming charge into the ignition pocket during the compression stroke.

4. An internal combustion engine, having a combustion chamber, means for introducing fuel therein during the compression stroke, such means being controllable as to period, an igniter, and separate means for introducing fuel during the compression stroke, in contact with the igniter, whereby inflammation will be transmitted to the fuel in the combustion chamber.

5. In an internal combustion engine, means for inflaming a refractory fuel through the agency of a priming charge of more inflammable fuel, both being introduced during the compression stroke.

6. In an internal combustion engine, a combustion chamber, means for introducing a power charge of heavy liquid hydrocarbon fuel during the compression stroke of the engine whereby the fuel will be atomized, separate means for introducing a priming charge of light liquid hydrocarbon fuel into the combustion chamber during the compression stroke of the engine, and means for igniting the priming charge whereby the power charge will be ignited throughout the combustion chamber.

This specification signed and witnessed this 17th day of October, 1906.

WILLIAM M. POWER.

Witnesses:
LEONARD H. DYER,
JOHN L. LOTSCH.